(No Model.)
D. W. BIRMINGHAM.
APPARATUS FOR THE TREATMENT OF AND EXTRACTION OF PRECIOUS METALS FROM ORES.
No. 342,421. Patented May 25, 1886.
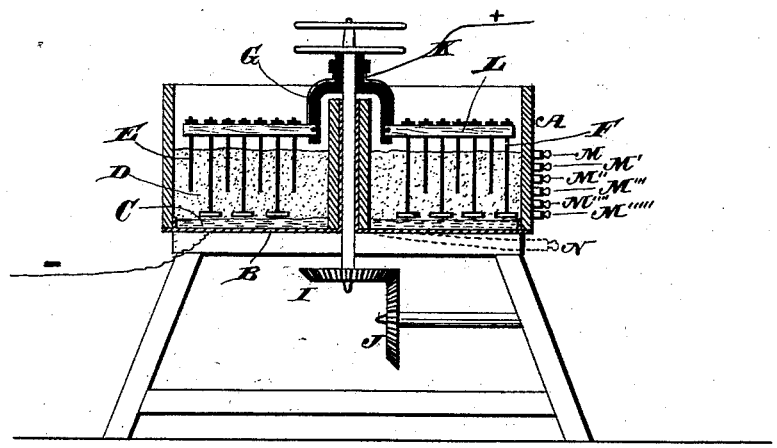
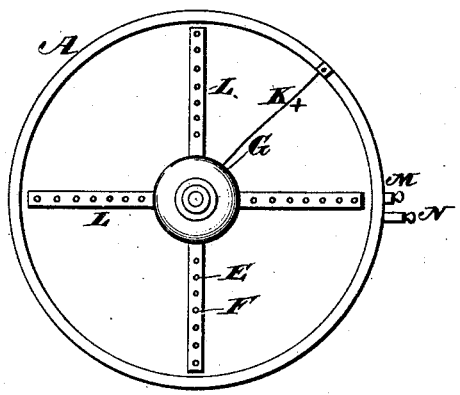
Witnesses
Robert Everett
J. A. Rutherford
Inventor
David W. Birmingham
By James L. Norris
Atty.

UNITED STATES PATENT OFFICE.

DAVID WALTON BIRMINGHAM, OF CLIFTON, NEW YORK.

APPARATUS FOR THE TREATMENT OF AND EXTRACTION OF PRECIOUS METALS FROM ORES.

SPECIFICATION forming part of Letters Patent No. 342,421, dated May 25, 1886.

Application filed December 20, 1883. Serial No. 115,205. (No model.)

*To all whom it may concern:*

Be it known that I, DAVID WALTON BIRMINGHAM, a citizen of the United States, residing at Clifton, county of Richmond, State of New York, have invented new and useful Improvements in Apparatus for the Treatment and Extraction of Precious Metals from their Ores, of which the following is a specification.

It is well known that many drawbacks are to be met with in the effort to successfully work ores of the nobler metals by amalgamation with mercury, and for this reason this mode has been more or less imperfectly performed. I have endeavored to obviate these difficulties and secure a higher percentage of the assay value of the ores by treating them in the following-described manner: The ores, if rebellious—that is, if combined with hostile bases—are first prepared by eliminating them of their refractory embodiments, and the precious minerals converted either into a free metallic or soluble form, or into some suitable condition as will render their subsequent treatment a more thorough and less difficult proceeding. This may be accomplished by any mode adapted to the particular end desired—as, for instance, the removal of sulphur and volatile matters by the process of roasting—otherwise the ores in basic combination are impossible to handle to any advantage. The process of amalgamation is made more or less complete as the mercury is finely diffused throughout the pulp and the minute metallic mineral brought into intimate contact with it. The mercury so diffused is in minute particles, known as "floured mercury," which experience has shown is difficult to segregate or collect in mass and settle into its normal fluid consistency. To surmount this obstacle and to amalgamate the fine particles of valuable metals remaining in the pulp, I apply the electrical current, as hereinafter more particularly described, which I also make serviceable in electrical deposition and precipitation of metals in solution, aiding the deposition with such well-known chemical ingredients, substances, or materials as may best serve my purpose. I sometimes charge the fluid mercury with metallic silver or copper or other useful equivalent, to increase its amalgamating affinity or electrical energy.

In the process of amalgamation, as in practice in modern mining operations, the flouring of the mercury and the difficulty attending its aggregation or reunition is a well-known fact, and as a consequent result in the failure to effectually settle it I have experienced a double loss, in the carrying away not only of a large percentage of quicksilver, but of fine gold or silver or floured amalgams of the same. It is at this point when the electricity is made available and where the feature of my invention presents itself, for by passing the current through the "slime" containing the fine floating particles of gold and silver, which are instantly coated with soluble mercury, whereby their precipitation to the bottom of the pan is effected. With this mode of collecting the floured mercury and saving the float-gold no further apprehensions need be felt concerning the losses by means of floured mercury referred to, for it will be an object now in the usual amalgamating processes to thoroughly intermix and blend the mercury as far as possible with the pulp, after which it is thrown down by the application of electricity into its regular amalgam.

My invention relates to the flouring of the mercury throughout the pulp, as in the customary methods of amalgamation, but applies in addition to the aggregation of the floured mercury by the use of the electric current after such flouring or the amalgamation is considered more or less complete and the pulp has been discharged into a settler ready for final settlement.

In the accompanying drawings, Figure 1 represents a vertical central section, and Fig. 2 a horizontal or top view, of an apparatus employed by me in carrying out my invention.

Referring to the accompanying drawings, it will be observed that Fig. 1 shows a circular pan-settler constructed of suitable material, preferably wood or a non-conducting substance, the feature being the presentation of an interior insulating or non-electrical conducting-surface, as the continuous side A.

B is a metallic bottom plate, serving as an electrical conductor, upon which rests some fluid mercury or mercuric amalgam C and pulp or slime D, diffused throughout with fine particles of metallic mercury.

G represents a suitable driving mechanism or muller-ring, to which is attached several removable radial arms, L, or such useful contrivance as is suitable to my purpose, said arms either having or being of an electrical-conducting substance, and arranged to be raised or lowered as desired. To each radial arm or equivalent device is attached suitable agitators, mullers, or pins of convenient or desirable shape, some of conducting and some of non-conducting material, the former being, preferably, of shorter length than the latter, E and F, respectively.

Through the center of the settler rises an insulated shaft, having proper devices or connections communicating the motive power to the muller-ring G and radial arms L. The effect of insulating and the object is to send the electric current to and down through the radial arms into the pulp or slime and out at the bottom of the pan, being carried away by suitable conductors. The ordinary devices for pan-settler, only suitably insulated for the purposes as above described, will answer.

The method of operation is as follows: The ores having passed through the usual roasting and other processes necessary for the successful preparation of the precious mineral for mercurial absorption or amalgamation, and the fine ore pulp having been thoroughly intermixed with the particles of mercury, or, if desired, with mercuric solution—such, for example, as mercuric nitrate or bi-chloride—is then admitted into any suitable settling-pan and the radial arms set in revolution, the agitators dipping into the pulp, the non-conducting agitators or mullers touching the mercury at the bottom of the settler, to assist in keeping its surface free from settling slimes or other base substances. A current of electricity is now admitted from the positive pole, say, to conductor K, or connecting with mechanism G, taking its course downward to the radial arms L, and distributed by suitable electric conductors to conducting-agitators E. The current descends through the entire electrified mass into the mercury or mercuric amalgam upon the bottom-plate conductor—the negative pole. The current, in thus passing through the pulp and slimes, not only precipitates and collects the fine floured mercury, but also serves to efficiently collect the float or fine particles of precious metals held in the slimes by coating said particles with mercury. I make use of such ingredients as will assist in this electrical deposition—for example, copper or silver filings or amalgams of these metals—by placing the substance into the pan, grinder, or in the settler with the pulp, as occasion may require, with which it becomes mixed or blended.

M M′ M″ M‴ M⁗ M‴″ are discharge-holes, and N outlet for the mercury or amalgam.

In applying electricity to the pulp, a heavy current is best rather than sharp strong ones, and to apply such current a large surface should connect from the wires to the pulp. This may be accomplished by placing plates in or on top of the pulp and connecting them with wires, thus affording a large metallic surface to receive the electric current from the wires and pass it into the slimes or pulp.

It will be understood that I do not herein claim the within-described treatment of the ores of the precious metals, as such will be made the subject-matter of future applications for patents.

Heretofore ore has been mixed with a copper amalgam and then subjected therewith to the action of a salt-water pickle in contact with an iron plate, after which electricity is applied.

In the separation of ores electricity in discontinuous currents has been used in connection with a continuous feed over riffles. These I do not claim with my improved apparatus. The material to be treated is acted on in separate charges, each of which is confined, and the electric current is continuous, thus avoiding waste of electric energy and incurring no loss of mercury or amalgam, while the operation of separating and extracting the precious metals is effected with great rapidity.

Having thus described my invention, what I claim is—

1. In an electrical settler for collecting floured mercury, the combination of a vat constructed of non-conducting material and provided with a metallic bottom with suitable insulated agitators, and means for passing an electric current through the settler and slimes, substantially as described, for the purpose specified.

2. In an electrical settler for collecting floured mercury, the combination of a vat, provided with a metallic bottom, and an agitator constructed with alternate agitators, of conducting and non-conducting material, substantially as described, for the purpose specified.

3. The combination of the annular bed or receptacle having a continuous copper lining or inner surface, horizontally revolving arms or wires projecting continuously into the contents of the receptacle, and electrical connections through the copper surface and the revolving arms, whereby the former becomes a cathode and the latter combined stirrers and anodes, and the electric circuit is continuous through the ore and mercury between the continuously-acting stirrers or anodes and cathodes, the float-gold being deposited thereby on the copper surface or cathode, substantially as described.

In testimony whereof I have hereunto set my hand in the presence of two subscribing witnesses.

DAVID WALTON BIRMINGHAM.

Witnesses:
MARK BIRMINGHAM,
J. C. ALVARADO.